United States Patent
Tsubouchi

[11] Patent Number: 5,992,947
[45] Date of Patent: Nov. 30, 1999

[54] NEGATIVE PRESSURE TYPE BOOSTER

[75] Inventor: Kaoru Tsubouchi, Aichi, Japan

[73] Assignee: Aisin Seiki Kabushiki Kaisha, Kariya, Japan

[21] Appl. No.: 08/933,174

[22] Filed: Sep. 18, 1997

[51] Int. Cl.$^6$ ....................................................... B60T 8/34
[52] U.S. Cl. .................................. 303/114.3; 303/113.3; 91/376 R
[58] Field of Search ........................... 303/114.1, 114.3, 303/113.3; 188/356, 357; 91/376 R, 367

[56] References Cited

U.S. PATENT DOCUMENTS

| | | | |
|---|---|---|---|
| 4,828,337 | 5/1989 | Wagner et al. | 303/114.1 |
| 5,367,942 | 11/1994 | Nell et al. | 91/376 R |
| 5,454,279 | 10/1995 | Castel et al. | 303/114.3 |
| 5,653,514 | 8/1997 | Castel et al. | 303/113.3 |
| 5,704,270 | 1/1998 | Tsubouchi | 91/376 R |
| 5,704,694 | 1/1998 | Kozakai | 303/114.3 |
| 5,845,556 | 12/1998 | Tsubouchi et al. | 91/376 R |
| 5,857,399 | 1/1999 | Tsubouchi et al. | 91/376 R |
| 5,890,775 | 4/1999 | Tsubouchi et al. | 303/114.3 |

FOREIGN PATENT DOCUMENTS 196 28 258  1/1997  Germany .
196 35 016  3/1997  Germany .

*Primary Examiner*—Robert J. Oberleitner
*Assistant Examiner*—Robert A. Siconolfi
*Attorney, Agent, or Firm*—Burns, Doane, Swecker & Mathis, LLP

[57] ABSTRACT

A negative pressure type booster 1 includes a housing 2, a movable wall 3 which divides the interior portion of the housing 2 into a constant pressure chamber 4 and a variable pressure chamber 5, a power piston 6 which outputs a brake output toward an output rod 10, an input member 8 which can be moved by a brake actuation, and a control valve 13. The output rod 10 can be divided into a first output rod 101 and a second output rod 102. The output rod 10 includes an auxiliary movable wall 17 which is provided within the constant pressure chamber 4 in such a manner that it can be moved by a given amount and also which can be engaged with the second output rod 102, a diaphragm 18 which is engaged with the auxiliary movable wall 17 in order to form an auxiliary variable pressure chamber 19 between the auxiliary movable wall 17 and itself, and communication chamber switching device which allows the auxiliary variable pressure chamber 19 to communicate selectively with either the constant pressure chamber 4 or the atmosphere.

9 Claims, 4 Drawing Sheets

NEGATIVE PRESSURE TYPE BOOSTER

BACKGROUND OF THE INVENTION

1. Field of the Invention

The present invention relates to a negative pressure type booster which is used to boost a brake force, and more particularly to a negative pressure type booster for use in a vehicle.

2. Description of the Related Art

Conventionally, there has been widely used a negative pressure type booster for reduction of an operation force when braking a vehicle. The conventional negative pressure type booster includes: a constant pressure chamber, which is normally in communication with an intake manifold provided in an engine and into which a negative pressure can be introduced; a variable pressure chamber which is used to select either a first state where the variable pressure chamber is cut off from the constant pressure chamber so that it is in communication with the atmospheres or a second state where the variable pressure chamber is in communication with the constant pressure chamber so that a negative pressure is introduced into the variable pressure chamber; a vacuum valve which is used to establish or cut off communication between the constant pressure chamber and the variable pressure chamber; and an air valve which is used to establish or cut off communication between the variable pressure chamber and the atmosphere. In the conventional negative pressure type booster, if the vacuum valve and the air valve are opened or closed by operating a brake operation member provided in the vehicle, then a pressure difference according to the operation force of a brake operation member can be set between the constant pressure chamber and variable pressure chamber, which makes it possible to generate a brake force which is amplified according to the operation force of the brake operation member.

By the way, in recent years, there has been known a negative pressure type booster including an electrically operated solenoid valve, where even when a brake operation member is not operated by a driver, the operation of the solenoid valve can bring a variable pressure chamber into communication with the atmosphere to thereby produce a large is pressure difference between the variable pressure chamber and a constant pressure chamber, so that a great brake force can be generated. For example, Japanese Patent Unexamined Publication No. Hei 5-24533 discloses a negative pressure type booster of the above-mentioned type.

On the other hand, conventionally, there is also known a brake fluid pressure device including a traction control system (hereinafter referred to as "TRC") in which when a vehicle starts to move, if an excessive drive force is applied onto the wheels of the vehicle to the degree that the drive wheels thereof are caused to slip on the surface of a road, without any braking operation by a driver, a brake force can be applied onto the side of the slipping drive wheels to increase a brake fluid pressure temporarily, thereby causing the slipping wheels to grip the road surface so that the vehicle wheels can be accelerated effectively. In such a brake fluid pressure device, there has been demanded an initial pressure increasing function to allow smoother supply of brake fluid which is used to give a brake force onto the side of the slipping wheels.

When the above-mentioned initial pressure increasing function is carried out in the above conventional negative pressure type booster, the following case can be expected: that is, for example, in the start of motion of the vehicle, if a drive force is given to the vehicle wheels excessively to thereby cause the drive wheels thereof to slip on the road surface, with no braking operation by a driver, the solenoid valve can be operated electrically, the operation of the solenoid valve can bring the variable pressure chamber into communication with the atmosphere to thereby produce a large pressure difference between the variable pressure chamber and the constant pressure chamber and thus generate a brake force, so that the brake fluid can be supplied to the slipping drive wheel side.

However, in the conventional negative pressure type booster, the great brake force is generated because the atmosphere is introduced into the variable pressure chamber to fill it up by means of the operation of the solenoid valve. Therefore, in the TRC or the like, when the conventional negative pressure type booster is operated as an initial pressure increasing function, if the solenoid valve or the like is out of order, then there exists a fear that the great brake force can be generated all the time.

SUMMARY OF THE INVENTION

The invention has been made under the above circumstance, and therefore it is an object of the invention to provide an automatically operatable negative pressure type booster, which not only can be applied as an initial pressure increasing function in a brake fluid pressure control device including a TRC or the like, but also eliminates a possibility that a great brake force can be generated even if a solenoid valve or the like is out of order.

In attaining the above object, according to the invention, there is provided a negative pressure type booster, comprising: a housing defining therein a pressure chamber; a movable wall disposed movably within said housing for dividing said pressure chamber into a constant pressure chamber for communicating with a negative pressure source and a variable pressure chamber for selectively communicating with the atmosphere and with said negative pressure source; a movable power piston connected with said movable wall; an input member disposed within said movable power piston and movable in an axial direction thereof due to a brake actuation; an output member outputting a propulsion force from said movable power piston in response to movement of said movable wall and dividable in the axial direction thereof into a first output member situated on an input side thereof and a second output member on an output side thereof; a control member for selectively communicating said variable pressure chamber with said negative pressure source or with the atmosphere according to movement of said input member against said movable power piston; an auxiliary movable wall disposed in said constant pressure chamber for engaging said second output member during movement of said auxiliary movable wall; an isolating member engaged with said auxiliary movable wall to form an auxiliary variable pressure chamber in cooperation with said auxiliary movable wall; and a communication chamber switching member for allowing said auxiliary variable pressure chamber to communicate selectively with said negative pressure source and the atmosphere.

Preferably, the negative pressure type booster may be structured such that the communication chamber switching means includes a through passage extending through the constant pressure chamber and communicating with the auxiliary variable pressure chamber, and an electromagnetic valve for allowing the through passage to communicate selectively with either the constant pressure chamber or the atmosphere.

Preferably, the negative pressure type booster may be structured such that engagement between the movable wall and the auxiliary movable wall can restrict the movement of the auxiliary movable wall to a given amount.

Preferably, the negative pressure type booster may be structured such that the movable wall includes in an inner peripheral end portion thereof a cylindrical portion disposed in coaxial relationship with the movable power piston and extending on the input side of the power piston, the auxiliary movable wall includes in the inner peripheral end portion thereof a cylindrical portion disposed in coaxial relationship with the power power piston and extending into the cylindrical portion of the movable wall, the cylindrical portion of the auxiliary movable wall includes a recessed portion extending a given amount in the axial direction thereof, and the cylindrical portion of the movable wall includes a projecting portion engageable with the recessed portion.

Preferably, the negative pressure type booster may be structured such that the recessed portion is a hole portion, and the inner peripheral end portion of the seal member is engageable with the portion of the auxiliary movable wall cylindrical portion that is situated on the output side from the hole portion and movable integrally with the auxiliary movable wall.

Preferably, the negative pressure type booster may be structured such that the auxiliary movable wall cylindrical portion includes a restriction portion for restricting the axial movement of the seal member inner peripheral end portion so that the inner peripheral end portion of the seal member can be moved integrally with the auxiliary movable wall.

Preferably, the negative pressure type booster may be structured such that the second output member includes a hole extending in the axial direction thereof from the input side end portion thereof, the first output member includes a shaft portion which can be inserted into the hole in the second output member, and the shaft portion is set longer than the axially extending amount of the recessed portion.

According to the negative pressure type booster of the invention, the communication chamber switching means is switched to allow the auxiliary variable chamber to communicate with the atmosphere so that there is produced a pressure difference between the auxiliary variable pressure chamber and constant pressure chamber; and the auxiliary movable wall is operated by use of the pressure difference thus produced to apply a force onto the second output member and move the same in the output direction by a given amount, so that a brake output can be provided.

According to the negative pressure type booster of the invention, the electromagnetic valve is operated to allow the through passage to communicate with the atmosphere, so that the atmosphere can be introduced into the auxiliary variable pressure chamber.

According to the negative pressure type booster of the invention, the movable wall and auxiliary movable wall are engaged with each other, thereby being capable of restricting the movement of not only the auxiliary movable wall but also the second output member to a given amount.

According to the negative pressure type booster of the invention, the movable wall and auxiliary movable wall are engaged with each other in such a manner that the projecting portion provided in the cylindrical portion of the movable wall is engaged with the recessed portion formed in the auxiliary movable wall, thereby being capable of restricting the movement of not only the auxiliary movable wall but also the second output member to a given amount.

According to the negative pressure type booster of the invention, as the auxiliary movable wall is moved, the inner peripheral end portion of the seal member is also moved.

According to the negative pressure type booster of the invention, the axial movement of the inner peripheral end portion of the seal member with respect to the auxiliary movable wall is restricted by the restriction portion provided in the auxiliary movable wall, whereby the inner peripheral end portion of the seal member is also moved as the auxiliary movable wall is moved.

According to the negative pressure type booster of the invention, the shaft portion of the first output member is inserted into the hole formed in the second output member, whereby the first and second output members can be assembled together in such a manner that they can be moved axially with respect to each other.

The above and other objects and features of the present invention will be more apparent from the following description taken in conjunction with the accompanying drawings.

DETAILED DESCRIPTION OF THE PREFERRED EMBODIMENTS

Now, a description will be given in more detail of a preferred embodiment of a negative pressure type booster according to the invention.

Figure 1:
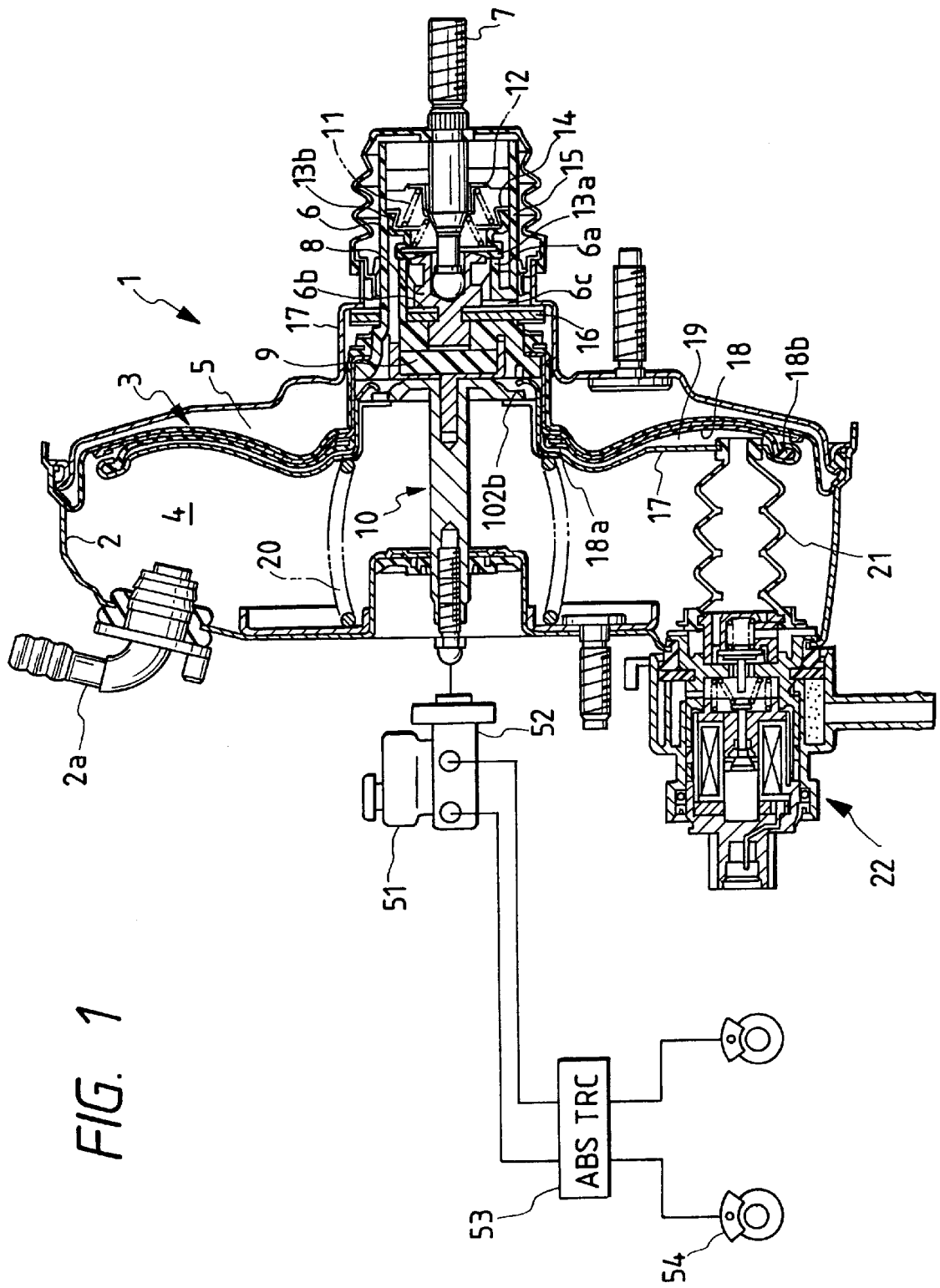
FIG. 1 is a cross-sectional view showing a negative pressure type booster according to an embodiment of the invention.

FIG. 1 is a section view showing a negative pressure type booster according to an embodiment of the invention. In FIG. 1, in a front portion of a negative pressure type booster 1, there is disposed a master cylinder 52 which includes a reservoir tank 51. An actuator part 53 for an ABS (Anti-lock brake system) and a TRC (Traction control system) is connected through fluid pressure pipes to the master cylinder 52, while wheel cylinders 54 are respectively connected through fluid pressure pipes to the actuator part 53.

The negative pressure type booster 1 includes a housing 2 defining therein a pressure chamber which is comprised of, in the interior portion thereof, a movable wall 3 which can be moved in the axial direction of the housing 2 and also which has an outer peripheral portion that is fixed in an airtight manner. The movable wall 3 divides the pressure chamber of the housing 2 into a constant pressure chamber 4 and a variable pressure chamber 5 in such a manner that they are arranged airtight with respect to each other. The constant pressure chamber 4 is in communication with an intake manifold (not shown) of an engine of a vehicle through an inlet 2a and is always generating a negative pressure.

A movable power piston 6, which is formed of resin material, is inserted into the housing 2 from the rear portion thereof, while the movable wall 3 is fixed in an airtight manner to the movable power piston 6 in the inner peripheral end thereof.

Into the interior portion of the movable power piston 6, there is inserted an input rod 7 which is connected to a brake actuation member (not shown) of a vehicle, for example, a brake pedal in the right end thereof in FIG. 1. The input rod 7 is connected to an input member 8 (which will be discussed later) in such a manner that it can be moved integrally with the input member 8.

The input member 8 performs a function to transmit a brake actuation force, which is applied from the input rod 7, to a reaction disk 9. When an output rod 10, which is in contact with the reaction disk 9, receives the brake actuation force through the reaction disk 9, then it is moved to operate the piston of the master cylinder 52.

To the input rod 7, there is fixed a first retainer 12 which receives a return spring 11. A second retainer 14, which supports a right end portion 13b of a control valve 13, is fixed to the movable power piston 6 through the first retainer 12 and return spring 11 while it receives an elastic force from the input rod 7. The control valve 13 is engaged with the second retainer 14 in the inner periphery of the right end portion 13b thereof in FIG. 1, while the control valve 13 generates a seal function between the outer periphery thereof and movable power piston 6. Between a retainer for supporting a seal portion 13a or a left end portion of the control valve 13 and the first retainer 12, there is interposed a valve spring 15.

With employment of the above structure, an air valve portion 13aa of the seal portion 13a of the control valve 13 is engaged with an air valve seat 8a formed in the rear end portion of the input member 8 when the input rod 7 is not in operation. Also, when the input rod 7 is in operation, a vacuum valve portion 13ab of the seal portion 13a is engageable with a vacuum valve seat 6a provided in the movable power piston 6. A key 16 is inserted into a key groove 6b formed in the movable power piston 6 and, when not in operation, it is in contact with the housing 2 through a damper member 17. Further, the movable power piston 6 includes an air passage 6c.

In the inner peripheral portion of the constant pressure chamber 4, there is provided an auxiliary movable wall 17 which serves as a partition plate engageable with a flange portion 102b of the output rod 10. The auxiliary movable wall 17 is airtight engaged with a diaphragm 18 which includes beads 18a and 18b for sealing respectively provided in the inner peripheral and outer peripheral portions thereof, thereby forming between them an auxiliary variable pressure chamber 19 which serves as an atmosphere introduction chamber. The auxiliary movable wall 17 receives an energizing force from the housing 2 due to a return spring 20. Also, an air passage 21, which is airtight connected in one end thereof with the auxiliary movable wall 17 and serves as a freely expandable and shrinkable atmosphere introduction passage, extends through the constant pressure chamber 4 and is airtight engaged in the other end thereof with an electromagnetic valve 22 (which will be discussed later).

Figure 2:
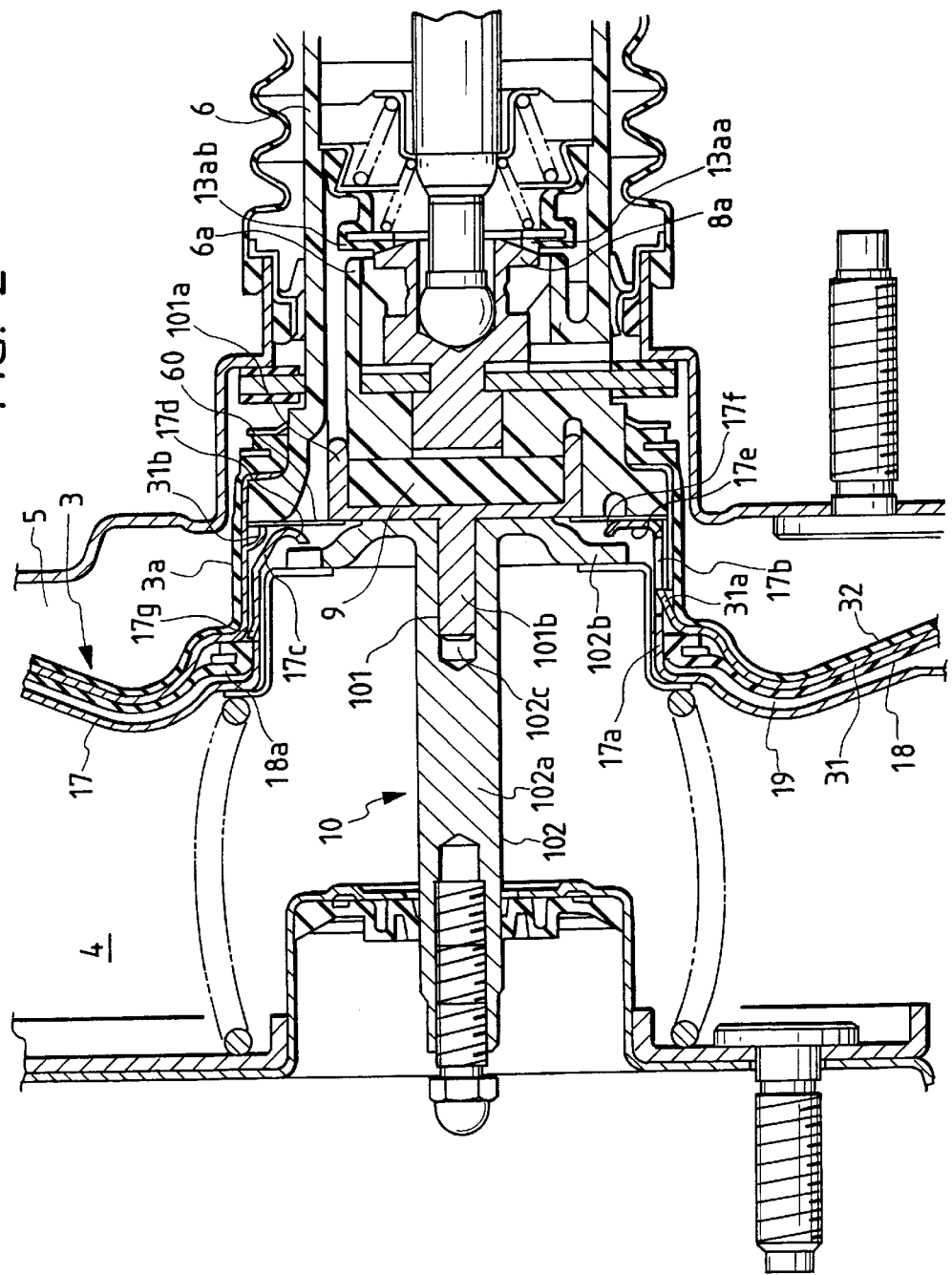
FIG. 2 is an enlarged view showing the neighborhood of an output rod shown in FIG. 1.

FIG. 2 is an enlarged view of the neighborhood of the output rod 10 shown in FIG. 1. As shown in FIG. 2, the output rod 10 includes a first output rod 101 situated on the power piston 6 side and a second output rod 102 situated on the master cylinder 52 side.

The first output rod 101 is made up of a cylindrical portion with a bottom 101a, which stores therein the reaction disk 9 and is fitted with the left end side of the power piston 6, and an engaging shaft portion 101b to be engaged with the second output rod 102.

On the other hand, the second output rod 102 includes a shaft portion 102a, the above-mentioned flange portion 102b, and an engaging hole 102c into which the engaging shaft portion 101b of the first output rod 101 can be inserted.

When the negative pressure type booster 1 is not in operation, as shown in FIG. 2, the first and second output rods 101 and 102 are set in such a manner that the engaging shaft portion 101b of the first output rod 101 is completely inserted into the engaging hole 102c of the second output rod 102 and, at the same time, the output side (in FIG. 2, the left side) end face of the cylindrical portion with a bottom 101a of the first output rod 101 is in contact with the input side (in FIG. 2, the right side) end face of the second output rod 102.

And, the movable wall 3 includes a plate 31 and a diaphragm 32, and additionally in the inner peripheral end portion thereof, a cylindrical portion 3a which is coaxial with the movable power piston 6 and extends on the input side (in FIG. 2, on the right side) of the movable power piston 6.

Also, the auxiliary movable wall 17 includes a cylindrical portion 17a in the inner peripheral end portion thereof. The cylindrical portion 17a is coaxial with the movable power piston 6, is situated on the input side (in FIG. 2, on the right side) of the movable power piston 6, extends within the cylindrical portion 3a of the movable wall 3a, and approaches the cylindrical portion 3a of the movable wall 3a in the diametrical direction thereof.

The auxiliary movable wall 17 includes, in the cylindrical portion 17a, a hole 17b which serves as a recessed portion extending by a given amount in the axial direction (in FIG. 2, in the right and left direction) of the wall 17, On the other hand, the movable wall 3 includes, in the cylindrical portion 3a extending in the plate 31, a first projecting portion 31a which is engageable with the hole 17b of the auxiliary movable wall 17.

The first projecting portion 31a is structured such that it is capable of relative motion within the hole 17b in the axial direction of the movable power piston 6 by a given amount, that is, the auxiliary movable wall 17 is structured such that it is capable of relative motion with respect to the movable wall 3 by a given amount in the axial direction (in FIG. 2, in the right and left direction).

The cylindrical portion 17a of the inner peripheral portion of the auxiliary movable wall 17 includes a taper portion 17c which exists together with the cylindrical portion 17a in the periphery of the cylindrical portion 17a and shows a taper shape curved inwardly in the diametrical direction of the movable power piston 6.

The taper portion 17c includes in the inner peripheral end portion thereof a turn portion 17d which is turned toward the output side (in FIG. 2, toward the left side) of the movable power piston 6 and is contactable with the flange portion 10a of the output rod 10.

The cylindrical portion 17a of the auxiliary movable wall 17 includes, in the movable power piston 6 input side end portion thereof, a flange portion 17e which is projected inwardly in the diametrical direction of the movable power piston 6. And, the flange portion 17e includes, in the inner peripheral end thereof, a turn portion 17f which is turned toward the output side (in FIG. 2, toward the left side) of the movable power piston 6 and is contactable with the flange portion 10a of the output rod 10.

The bead portion 18e, which is the inner peripheral end portion of the diaphragm 18 having a flexibility and serving as a seal member and an isolating member, is airtight fitted with the portion of the cylindrical portion 17a, which is the inner peripheral end portion of the auxiliary movable wall 17, that is situated on the output side (in FIG. 2, on the left side) of the hole 17b and, at the same time, the movement of the bead portion 18e in the axial direction of the movable power piston 6, that is, the relative motion of the bead portion 18e in the axial direction of the movable power piston 6 with respect to the auxiliary movable wall 17 is restricted by a restriction portion 17g which is provided in the cylindrical portion 17a serving as the inner peripheral end portion of the auxiliary movable wall 17.

The plate 31 of the movable wall 3 further includes a second projecting portion 31b, while the second projecting portion 31b and the left end portion of the movable power piston 6 hold a restriction plate 60 between them.

The axial length of the engaging shaft portion 101b of the first output rod 101 is set longer than the axial length of the hole 17b of the auxiliary movable wall 17.

Figure 3:
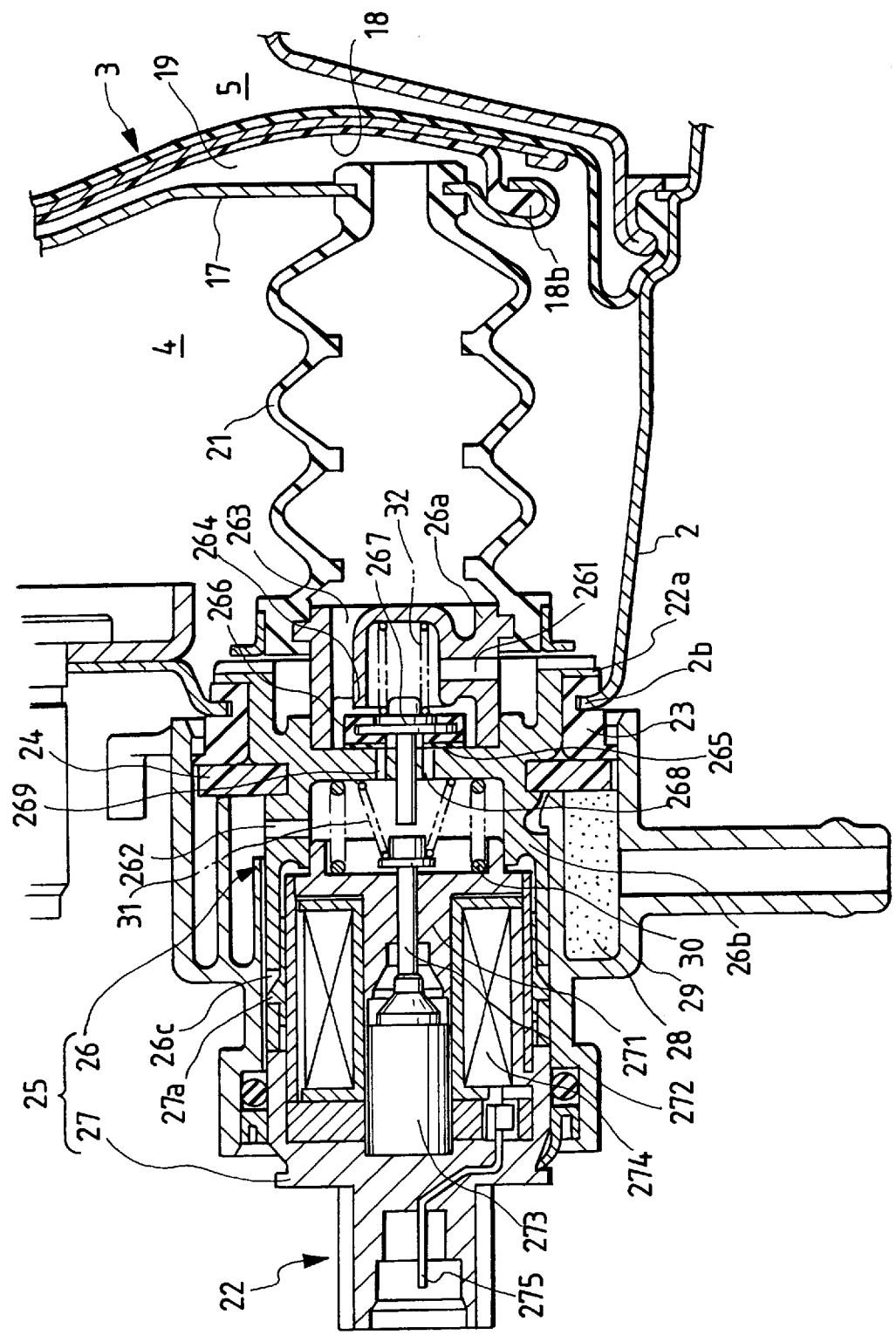
FIG. 3 is an enlarged view showing an electromagnetic valve shown in FIG. 1.

Now, FIG. 3 is an enlarged view of the electromagnetic valve device 22 shown in FIG. 1. As shown in FIG. 3, the electromagnetic valve device 22, which serves as switching means for connecting the auxiliary variable pressure chamber 19 of the negative pressure type booster 1 selectively to either of the constant pressure chamber 4 or the atmosphere, is inserted from the interior portion of the housing 2 through a seal member 23 into a hole 2b formed in the front surface of the housing 2 for assembly of the electromagnetic valve device 22, a securing portion 22a formed in the electromagnetic valve device 22 is secured through the seal member 23 to the outer peripheral portion of the hole 2b on the inner surface of the housing 2, and a retainer ring 24 serving as a securing member is fitted with an engaging groove formed in the outer periphery of the electromagnetic valve device 22 and is also secured to the outer surface of the housing 2 through the seal member 23, so that the electromagnetic valve device 22 can be airtight engaged with the front surface of the housing 2.

The electromagnetic valve device 22 includes a housing 25 which can be divided into a first valve housing 26 and a second valve housing 27.

The first valve housing 26 includes, in the interior portion thereof, a constant pressure port 261 in communication with the constant pressure chamber 4, an atmosphere port 262 in communication with an atmosphere introduction air cleaner 29 including a cleaner member 28, a variable pressure port 263 connected with the atmosphere passage 21, a constant pressure valve seat 264 for allowing the constant pressure chamber 4 and auxiliary variable pressure chamber 19 to communicate with each other, an atmosphere valve seat 265 for allowing the atmosphere and auxiliary variable pressure chamber 19 to communicate with each other, and a valve body part 267 including a valve 266 formed as a valve body in the leading end portion thereof.

Also, the first valve housing 26 is composed of a first valve housing first part 26a, which includes the constant pressure port 261, variable pressure port 263 and constant pressure valve seat 264 and with which the other end portion of the atmosphere passage 21 can be connected, and a first valve housing second part 26b which shows a substantially cylindrical shape, the interior portion of which is divided by a partition wall into a first recessed portion to be assembled with the first valve housing first part 26a and a second recessed portion to be assembled with the second valve housing 27, and also which includes the atmosphere valve seat 265 to be disposed on the partition wall and the valve body part 267.

The valve body part 267 is assembled into a through hole 268 formed in the partition wall of the first valve housing second part 26b and, in the present partition wall, there is also formed a communication hole 269 which allows the above-mentioned first and second recessed portions to communicate with each other.

The second valve housing 27 comprises a fixed core 271, a movable core 273, a rod part 272 extending through the fixed core 271 and contactable with the movable core 273 on the one end (left end) side thereof, and a solenoid 274 which is disposed in such a manner that it covers the outer peripheries of the fixed core 271 and movable core 273.

The electromagnetic valve device 22 includes, in the outer peripheral portion thereof, the atmosphere introduction air cleaner 29 forming an atmosphere inflow passage through which the atmosphere flowing through the electromagnetic valve device 22 into the atmosphere introduction passage 21 is allowed to flow and also which detours the outer periphery of the electromagnetic valve device 22.

The atmosphere introduction air cleaner 29 is in communication with a space (not shown) formed in the interior portion of a vehicle through a tube (not shown).

Now, the first valve housing 26 includes an engaging recessed portion 26c, while the second valve housing 27 includes an engaging projection 27a which can be engaged with the engaging recessed portion 26c. When the first and second valve housings 26 and 27 are assembled together, the second valve housing 27 is inserted into the first valve housing 26, that is, the second recessed portion of the first valve housing second part 26b, the leading end portion of the first valve housing 26 is elastically deformed to move beyond the engaging projection 27a, and the engaging recessed portion 26c is snap connected to the engaging projection 27a, so that the first and second valve housings 26 and 27 are connected together as an integrated body.

The respective engaging portions of the engaging recessed portion 26c and engaging projection 27a are covered with the inner surface of the atmosphere introduction air cleaner 29.

Between not only the movable core 273 but also the rod part 272 and the partition wall of the first valve housing 26, there is interposed a second spring 31 which energizes the rod part 272 in a direction to move the movable core 273 apart from the fixed core 271 and in a direction (in FIG. 3, in the left direction) to move the rod part 272 apart from the valve body part 267.

Also, between the fixed core 271 and the partition wall of the first valve housing 26, there is interposed a first spring 30. The second valve housing 27 is energized in the left direction in FIG. 2 by the first spring 30, thereby restricting the relative movements of the first valve housing 26 and second valve housing 27 in the axial direction (in FIG. 3, in the right and left direction) of the electromagnetic valve device 22.

The solenoid 274 is connected to the power source (not shown) of the vehicle through a terminal 275 and can be operated when power is supplied from the power source by means of a controller (not shown) of the vehicle.

The valve body part 267, which is disposed within the first valve housing 26, is energized in the left direction in FIG. 3 by a third spring 32, so that the valve 266 is moved apart from the constant pressure valve seat 264 and is contacted with the atmosphere valve seat 265. Also, the rod part 272 and valve body part 267 are not in contact with each other in a state shown in FIG. 3 in which the electromagnetic valve device 22 is not in operation.

In this state, since the valve 266 is not in engagement with the constant pressure valve seat 264, the auxiliary variable pressure chamber 19 is in communication with the constant pressure chamber 4 through the interior portion of the atmosphere introduction passage 21, variable pressure port 263, a gap between the valve 266 and constant pressure valve seat 264, and constant pressure port 261.

On the other hand, as described before, if power is supplied to the solenoid 274 from the power source by means of the vehicle controller (not shown), then the solenoid 274 is operated to attract the movable core 273 toward the fixed core 271, so that the movable core 273 is slided toward the fixed core 271 (in FIG. 3, in the right direction). As a result of this, not only the movable core 273 is pressed against the rod part 272 but also the movable core 273 and rod part 272 are moved integrally in the right direction in FIG. 2.

Then, the right end portion of the rod part 272 energized by the movable core 273 is contacted with the left end portion of the valve body part 267, the rod part 272 is pressed against the valve body part 267 in the right direction in FIG. 2, the valve 266 is contacted with the constant pressure valve seat 264, and the valve 266 is disengaged from the atmosphere valve seat 265.

Therefore, the atmosphere is introduced from the above-mentioned vehicle interior portion space (not shown) into the auxiliary variable pressure chamber 19 through the interior portion of the atmosphere introduction passage 21, variable pressure port 263, the gap between the valve 266 and atmosphere valve seat 26, communication hole 269, atmosphere port 262, and atmosphere introduction air cleaner 29.

Now, the actuator part 53 shown in FIG. 1 comprises, in the interior portion thereof, a fluid pressure duct through which the brake fluid flows, an electromagnetic valve unit for cutting off the flow of the brake fluid in the fluid pressure duct, a reservoir in which the brake fluid can be stored, a pump unit for attracting and discharging the brake fluid, an electronic control unit (ECU) for controlling the electromagnetic valve unit, pump unit and the like, and other members.

Figure 4:
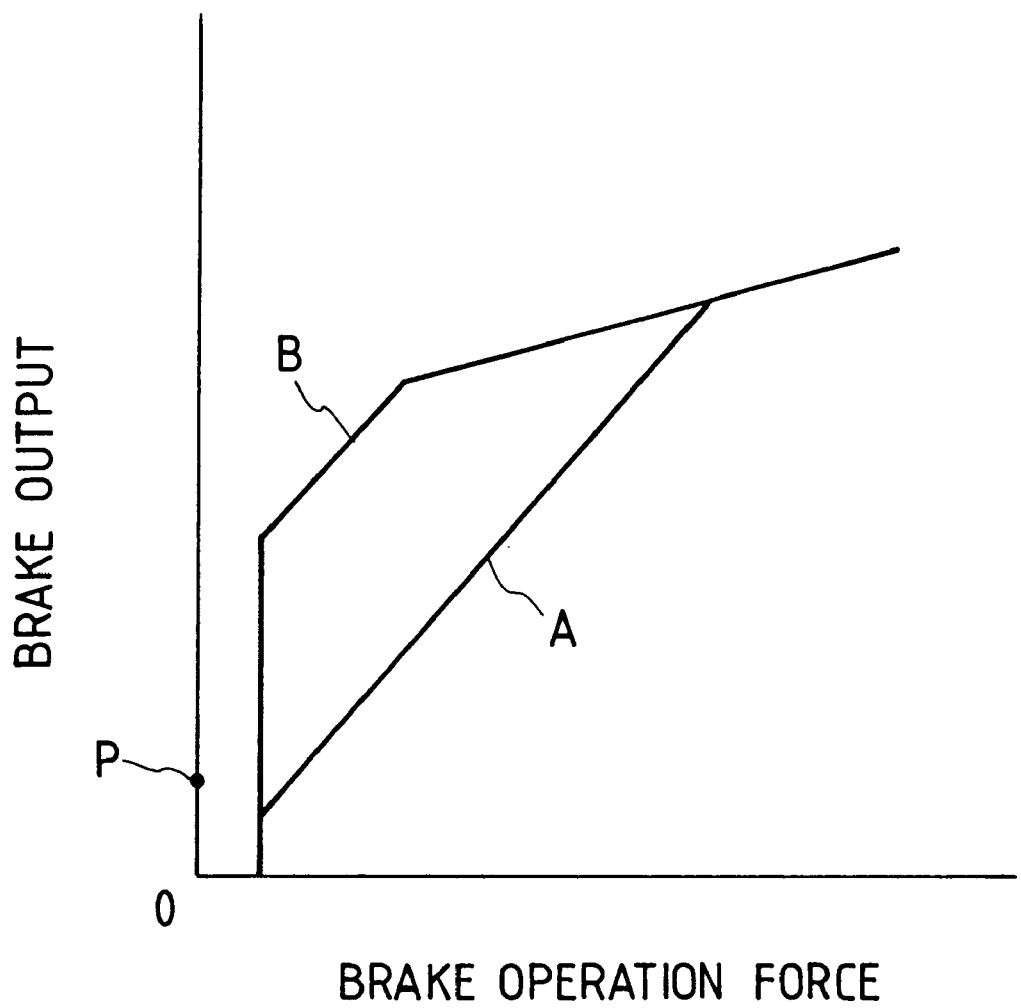
FIG. 4 is a characteristic graphical view showing the negative pressure type booster according to the embodiment of the invention.

Here, a description will be given below of the operation of the negative pressure type booster 1. FIG. 4 is a characteristic graphical representation of the negative pressure type booster 1, in which the vertical line expresses a brake output and the horizontal line represents a brake actuation force. As shown in FIGS. 1 to 4, when the driver is not operating the vehicle brake actuation member (not shown), the negative pressure type booster 1 is set in a state shown in FIG. 1, in which the seal portion 13*a* of the control valve 13 is in engagement with the input member 8, and the seal portion 13*a* is not in engagement with the vacuum valve seat 6*a* of the movable power piston 6, so that the variable pressure chamber 5 is in communication with the vehicle engine intake manifold (not shown) serving as a negative pressure source through the constant pressure chamber 4.

If the vehicle brake actuation member such as a brake pedal is operated by the driver, then the input rod 7 coupled to the brake actuation member is given a brake actuation force and is thereby moved in the left direction in FIG. 1. As a result of this, the input member 8 fixed to the input rod 7 is also moved in the left direction in FIG. 1 integrally with the input rod 7.

With the movement of the input member 8, not only the control valve 13 but also the seal portion 13*a* are moved in the left direction in FIG. 1 together with the input member 8 due to the energizing force of the valve spring 15, and then the seal portion 13*a* comes into contact with the vacuum valve seat 6*a* of the movable power piston 6 to thereby cut off the communication of the variable pressure chamber 5 with the constant pressure chamber 4, so that the communication of the variable pressure chamber 5 with the vehicle negative pressure source is also cut off.

Further, if the input member 8 is moved left in FIG. 1, then the engagement between the seal portion 13*a* and input member 8 is removed, so that the variable pressure chamber 5 is allowed to communicate with the atmosphere. As a result of this, the atmosphere flows into the variable pressure chamber 5 to thereby produce a pressure difference between the constant pressure chamber 4 and variable pressure chamber 5. This pressure difference applies a load to the movable wall 3, with the result that the movable wall 3 and the movable power piston 6 coupled to the movable wall 3 are pressed against the first output rod 101 through the reaction disk 9.

If the first output rod 101 is pushed and moved left in this manner, then the output side (in FIG. 2, the left side) end face of the cylindrical portion with a bottom 101*a* is pressed against the input side (in FIG. 2, the right side) end face of the flange portion 102*b*, so that the second output rod 102 is also moved left. That is, the movable power piston 6 outputs an amplified brake force to the output rod 10.

When the brake force is output to the output rod 10 and the output rod 10 is moved left in FIG. 1, then the piston of the master cylinder 52 is pushed to thereby cause the brake liquid to flow out to the wheel cylinder 54 through the actuator part 53, so that a brake force is applied to the vehicle wheel.

After then, in accordance with reactive forces which the input rod 7 receives from the reaction disk 9 through the input member 8, the seal portion 13*a* is engaged selectively with either the input member 8 or the vacuum valve seat 6*a* of the movable power piston 6, and, according to the brake actuation force of the driver applied to the input rod 7, the supplementing force of the negative pressure type booster 1 is controlled.

The reactive force due to the brake force by the movable power piston 6 and the brake actuation force generated by operating the brake pedal and transmitted to the input member 8 are applied to the reaction disk 9 to balance with each other.

In this state, since the solenoid 274 is not in operation, the auxiliary variable pressure chamber 19 is in communication with the constant pressure chamber 4 and thus there exists no pressure difference between before and behind the auxiliary movable wall 17, so that the auxiliary movable wall 17 is not in operation. A relationship between the brake actuation force acting on the input rod 7 and the brake output acting on the output rod 9 at the then time is shown by a line A in FIG. 4.

For example, when an obstacle appears in front of the vehicle, in particular, when the above-mentioned controller (not shown) of the vehicle detects, based on a pedal stroke value detected by a pedal stroke sensor (not shown) mounted on the brake pedal, that the brake pedal is operated at a pedal stroke speed higher than a certain threshold value, emergency brake is necessary. That is, when it is judged that such emergency brake is necessary, separately from the brake actuation to be performed by the driver, power is supplied from the power source to the solenoid 274 to thereby start an automatic operation which allows the negative pressure type booster 1 to provide a higher output than the ordinary output thereof. On receiving the supply of the power, the solenoid 274 generates an electromagnetic force to move the movable core 273 right in FIG. 3 against the energizing forces of the springs 31 and 32.

As described before, since the atmosphere is introduced into the auxiliary variable pressure chamber 19 due to the movement of the movable core 273, there is produced a pressure difference between before and behind the auxiliary movable wall 17, so that the auxiliary movable wall 17 is moved left in FIG. 1 while the outer peripheral surface of the cylindrical portion 17a of the auxiliary movable wall 17 being guided by the inner peripheral surface of the cylindrical portion 3a of the movable wall 3.

As a result of the movement of the auxiliary movable wall 17, on the inner peripheral side of the auxiliary movable wall 17, the turn portions 17d and 17f of the auxiliary movable wall 17 are engaged with the outer peripheral portions of the flange portion 102b of the second output rod 102 to apply a load only to the second output rod 102, so that only the second output rod 102 is moved left in FIG. 1.

Also, with the movement of the auxiliary movable wall 17, the restriction portion 17g of the auxiliary movable wall 17 is engaged with the bead portion 18a of the diaphragm 18 and not only the bead portion 18a but also the diaphragm 18 are moved left in FIG. 1. That is, since the bead portion 18a is moved left in FIG. 1, there is no fear that the bead portion 18a can drop into the hole 17b of the auxiliary movable wall 17 due to the movement of the auxiliary movable wall 17; and, at the same time, there is no fear that the dropping of the bead portion 18a into the hole 17b can destroy the airtight condition between the auxiliary variable pressure chamber 19 and constant pressure chamber 4 to cause the atmosphere within the auxiliary variable pressure chamber 19 to flow out therefrom into the constant pressure chamber 4, thereby eliminating a pressure difference between the auxiliary variable pressure chamber 19 and constant pressure chamber 4, which makes it impossible to apply any load to the second output rod 102.

The movement of the auxiliary movable wall 17 in the left direction in FIG. 1 is restricted to a given amount due to the contact of the hole 17b of the auxiliary movable wall 17 with the first projecting portion 31a of the movable wall 3.

Because the load applied to the second output rod 102 does not act on the reaction disk 9, the load does not provide is a reaction force to the input member 8 but is increased purely as a brake output.

Also, due to the fact that the second output rod 102 is moved left in FIG. 2, there is produced friction between the inner periphery of the engaging hole 102c of the second output rod 102 and the outer periphery of the engaging shaft portion 101b of the first output rod 101, so that the first output rod 101 is also to be moved left in FIG. 2. However, in this case, the output side (in FIG. 2, the left side) end face of the cylindrical portion with a bottom 101a of the first output rod 101 is engaged with the restriction plate 60, which restricts the movement of the first output rod 101 in the left direction in FIG. 2. Therefore, there is no fear that the first output rod 101 can slip off the movable power piston 6.

Further, since the axial length of the engaging shaft portion 101b is set longer than the axial length of the hole 17b, that is, the amount of movement of the auxiliary movable wall 17, there is eliminated a fear that the engagement between the first output rod 101 and second output rod 102 can be removed when the second output rod 102 is moved toward the output side (in FIG. 2, to the left side) relatively with respect to the first output rod 101, that is, there is eliminated a fear that the first output rod 101 can slip off the second output rod 102.

The introduction of the atmosphere into the auxiliary variable pressure chamber 19 increases by a given amount the brake output acting on the output rod 10 with respect to the same brake actuation force acting on the input rod 7 when compared with a state in which the interior portion of the auxiliary variable pressure chamber 19 is held in a negative pressure. A relationship between the brake actuation force acting on the input rod 7 and the brake output acting on the output rod at the then time is shown by a line B in FIG. 4.

If the driver of the vehicle judges that there is no necessity for the brake actuation any longer and thus returns the brake pedal of the vehicle to its original position, then the input member 8 is moved right integrally with the input rod 7 as the input rod 7 retreats, the seal portion 13a of the control valve 13 is engaged with the input member 8 and is thus detached from the valve seat 6a of the movable power piston 6 to thereby cause the variable pressure chamber 5 to be cut off from the atmosphere and to communicate with the constant pressure chamber 4, so that the degree of negative pressure within the variable pressure chamber 5 is increased again and thus the supplement force to the movable power piston 6 is also lowered. And, due to not only the reactive force from the master cylinder 52 but also the return spring 20 within the booster, the movable power piston 6 and input rod 7 are moved right in FIG. 2 and, after then, if the input is removed, then the return stroke can be completed.

At the then time, if a microcomputer (not shown) detects, by a conventional brake switch provided in the brake pedal (not shown), that the brake actuation is removed, then the supply of power from the power source to the solenoid 274 is stopped, so that the solenoid 274 generates an electromagnetic force to the movable core 273 no longer and thus the movable core 273 is returned to the left in FIG. 3 due to the energizing force of the second spring 31 through the rod part 272. Also, the valve body part 267 is energized in the left direction in FIG. 2 due to the energizing force of the third spring 32, and the valve 266 is detached from the constant pressure valve seat 264 and is contacted with the atmosphere valve seat 265.

Due to the movements of the movable core 3 and valve body part 267 in the left direction in FIG. 3, the auxiliary variable pressure chamber 19 is cut off from the atmosphere and is caused to communicate with the constant pressure chamber 4 again, not only the bead portion 18a but also the diaphragm 18 are pushed back toward their respective initial positions by the return spring 20 through the auxiliary movable wall 17, and thus the engagement between the turn portions 17d, 17f of the auxiliary movable wall 17 and the flange portion 102b of the output rod 10 is removed, thereby returning the negative pressure type booster 1 to its initial state completely. That is, the operation to make the negative pressure type booster 1 provide the higher output than the normal output is completed. For example, when the vehicle starts to move, if the ECU of the actuator part 53 detects that an excessive drive force is applied onto the wheels and the drive wheel slips on the road surface, then, with no brake actuation by the driver, there is started the operation of a well-known TRC (Traction Control) system in which the brake liquid is flown from the pump unit of the actuator part 53 to the wheel cylinder to thereby apply a brake force to the slipping wheel.

While the operation of the TRC system is started in the actuator part 53, the automatic operation is also started in which power is supplied from the power source to the solenoid 274 to thereby cause the negative pressure type booster 1 to provide the higher output than the normal output.

On receiving the power from the power source, the solenoid 274 generates an electromagnetic force to move the movable core 273 right in FIG. 3 against the energizing forces of the two springs 31 and 32.

As described before, since the atmosphere is introduced into the auxiliary variable pressure chamber 19 due to the movement of the movable core 273, there is produced a pressure difference between before and behind the auxiliary movable wall 17 and thus the auxiliary movable wall 17 is moved left in FIG. 1 while the outer peripheral surface of the cylindrical portion 17a of the auxiliary movable wall 17 is being guided by the inner peripheral surface of the cylindrical portion 3a of the movable wall 3.

With the movement of the auxiliary movable wall 17, on the inner peripheral side of the auxiliary movable wall 17, the turn portions 17d and 17f of the auxiliary movable wall 17 are engaged with the outer peripheral portion of the flange portion 102b of the second output rod 102, which applies a load only onto the second output rod 102 and move the same in the left direction in FIG. 2.

Also, with the movement of the auxiliary movable wall 17, the restriction portion 17g of the auxiliary movable wall 17 is engaged with the bead portion 18a of the diaphragm 18, and not only the bead portion 18a but also the diaphragm 18 are moved left in FIG. 1. That is, since the bead portion 18a is moved left in FIG. 1, there is eliminated a fear that the bead portion 18a can drop into the hole 17b of the auxiliary movable wall 17 due to the movement of the auxiliary movable wall 17; and, at the same time, there is avoided a fear that the dropping of the bead portion 18a into the hole 17b can destroy the airtight state between the auxiliary variable pressure chamber 19 and constant pressure chamber 4 to cause the atmosphere within the auxiliary variable pressure chamber 19 to flow out into the constant pressure chamber 4, thereby eliminating a pressure difference between the auxiliary variable pressure chamber 19 and constant pressure chamber 4, which makes it impossible to apply any load to the second output rod 102.

Further, due to the fact that the second output rod 102 is moved left in FIG. 2, there is produced friction between the inner periphery of the engaging hole 102c of the second output rod 102 and the outer periphery of the engaging shaft portion 101b of the first output rod 101, so that the first output rod 101 is also to be moved left in FIG. 2. However, in this case, the output side (in FIG. 2, the left side) end face of the cylindrical portion with a bottom 101a of the first output rod 101 is engaged with the restriction plate 60, which restricts the movement of the first output rod 101 in the left direction in FIG. 2. Therefore, there is no fear that the first output rod 101 can slip off the movable power piston 6.

In addition, since the axial length of the engaging shaft portion 101b is set longer than the axial length of the hole 17b, that is, the amount of movement of the auxiliary movable wall 17, there is eliminated a fear that the engagement between the first output rod 101 and second output rod 102 can be removed when the second output rod 102 is moved toward the output side (in FIG. 2, to the left side) relatively with respect to the first output rod 101, that is, there is eliminated a fear that the first output rod 101 can slip off the second output rod 102.

The movement of the auxiliary movable wall 17 in the left direction in FIG. 1 is restricted to a given amount due to the contact of the hole 17b of the auxiliary movable wall 17 with the first projecting portion 31a of the movable wall 3.

If a load due to a pressure difference between the constant pressure chamber 4 and auxiliary variable pressure chamber 19 is applied to the second output rod 102 and the second output rod 102 is thereby moved left in FIG. 1, then the piston of the master cylinder 52 is pushed by the same to thereby cause the brake fluid to flow through the actuator part 53 into the wheel cylinder 54, so that a brake force can be applied to the slipping wheel. A relationship between the brake actuation force acting on the input rod 7 and the brake output acting on the first output rod 101 at the then time is shown by a point P in FIG. 4. That is, in the state of input=0, the brake output is output.

As described above, the amount of movement of the auxiliary movable wall 17 is restricted to a given amount in accordance with the axial length of the hole 17b. Preferably, this movement amount may be decided by the amount of supply of the brake fluid in order to be able to help a pump in supplying the brake fluid to the brake system in the TRC system; or, this movement amount may be decided by the amount of oil required corresponding to a clearance between a pad and a rotor which is enlarged in order to reduce the dragging of a disk brake.

For example, the movement amount of the auxiliary movable wall 17 is 5~10 mm, and the brake output P is 3~10 kg/cm$^2$.

That is, an output at the point P in FIG. 4 is an output value which is suitable for an initial pressure increasing function in the TRC system.

Therefore, in the operation start time of the TRC system, not only the brake fluid from the pump unit of the actuator part 53 but also the brake fluid from the master cylinder 52 due to the automatic operation of the negative pressure type booster 1 are flown into the wheel cylinder 54, so that the brake fluid pressure on the slipping wheel side can be increased smoothly, As a result of the operation of the TRC system, the brake fluid pressure on the slipping wheel side can be increased temporarily so that the slipping wheel can be made to grip the road surface and thus the wheel can be accelerated effectively.

In the present operation of the TRC system, the automatic operation of the negative pressure type booster 1 performs a pre-charge function in the TRC system.

As has been described in the above-mentioned embodiment, according to the negative pressure type booster 1 of the invention, since the amount of movement of not only the auxiliary movable wall 17 but also the second output rod 102 in the axial direction output side (in FIG. 1, to the left side) is set in such a manner that a brake pressure suitable for the initial pressure increasing function in the TRC system can be output, of course, the present negative pressure type booster 1 is a negative pressure type booster which can be applied to the initial pressure increasing function in the TRC system; and, at the same time, even if the electromagnetic valve 22 or the like breaks down while the negative pressure type booster 1 is operating as an initial pressure increasing function, the brake pressure is generated in the present negative pressure type booster 1, when compared with the conventional negative pressure type booster which provides the maximum supplementing force in such case, that is, the brake pressure of the present device 1 is not large as the brake output, which eliminates a fear that a strong brake force can be generated.

Also, the engagement between the first projecting portion 31a of the cylindrical portion 3a of the movable wall 3 and the hole 17b of the auxiliary movable wall 17 makes it sure to restrict the relative movement of the auxiliary movable wall 17 with respect to the movable wall 3 to a given amount, while such given amount can be set easily in accordance with the axial length of the hole 17b.

Further, due to the fact that the restriction portion 17g of the auxiliary movable wall 17 is engaged with the bead portion 18a of the diaphragm 18 with the movement of the auxiliary movable wall 17 and the bead portion 18a is thereby moved left in FIG. 1, there is eliminated a fear that the bead portion 18a can drop into the hole 17b of the auxiliary movable wall 17 due to the movement of the auxiliary movable wall 17; and, at the same time, there is also eliminated a fear that the dropping of the bead portion 18a into the hole 17b can destroy the airtight condition between the auxiliary variable chamber 19 and constant pressure chamber 4 to cause the atmosphere within the auxiliary variable chamber 19 to flow into the constant pressure chamber 4, thereby causing a pressure difference between the auxiliary variable chamber 19 and constant pressure chamber 4 to disappear, so that no lead can be applied to the second output rod 102.

Since the axial length of the engaging shaft portion 101b is set larger than the axial length of the hole 17b, that is, the amount of movement of the auxiliary movable wall 17, there is eliminated a fear that, when the second output rod 102 is moved toward the output side (in FIG. 2, toward the left side) relatively with respect to the first output rod 101, the engagement between the first and second output rods 101 and 102 can be removed, that is, the first output rod 101 can slip off the second output rod 102.

In addition, according to the negative pressure type booster 1 which is the illustrated embodiment of the invention, it goes without saying that it has a brake assist function to supplement the short pedaling force of the driver in hard braking.

Therefore, according to the invention, it is possible to provide a negative pressure type booster which is capable of automatic operation, can be applied to a brake fluid pressure control unit including the TRC system and the like as an initial pressure increasing function, and can prevent the generation of a strong brake force even when a solenoid valve or the like breaks down.

In the illustrated embodiment, the negative pressure type booster of the invention is applied in the brake fluid pressure circuit including the TRC system. However, it goes without saying that the invention is not limited to this structure but the invention can be applied in every brake fluid pressure circuit requiring an initial pressure increasing function.

While the invention has been described in conformity with the above-mentioned embodiment thereof, the invention is not limited only to the above-mentioned embodiment but includes other various embodiments which are based on the principle of the invention.

According to the invention, since the amounts of the axial movements of not only the auxiliary movable wall but also the second output rod are set in such a manner that there can be output a brake pressure suitable for an initial pressure increasing function in a brake fluid pressure control unit including the TRC system and the like, it goes without saying that the present negative pressure type booster is a negative pressure type booster which can be applied as an initial pressure increasing function in the TRC system and the like. Also, in the present negative pressure type booster, even if the communication chamber switching means or the like breaks down while the present negative pressure type booster is operating as an initial pressure increasing function, when compared with the conventional negative pressure type booster which provides the maximum supplement force, there is generated a brake pressure which is not large as a brake output but is suitable for the initial pressure increasing function, which eliminates a fear that a strong brake force can be generated.

Therefore, according to the invention, it is possible to provide a negative pressure type booster which is capable of automatic operation, can be applied as an initial pressure increasing function in the TRC system or the like, and can prevent the generation of a strong brake force even when a solenoid valve or the like breaks down.

Also, according to the invention, it is possible to provide a more preferred embodiment of the communication chamber switching means.

Further, according to the invention, the engagement between the movable wall and auxiliary movable wall makes it possible to restrict surely the relative movement of the auxiliary movable wall with respect to the movable wall to a given amount.

Still further, according to the invention, not only the engagement between the cylindrical projecting portion of the movable wall and the hole portion of the auxiliary movable wall makes it possible to restrict surely the relative movement of the auxiliary movable wall with respect to the movable wall to a given amount, but also this given amount can be set easily in accordance with the axial length of the hole portion.

Yet still further, according to the invention, due to the fact that the inner peripheral end portion of the seal member is moved as the auxiliary movable wall is moved, not only there is eliminated a fear that the inner peripheral end portion of the seal member can drop into the hole of the auxiliary movable wall due to the movement of the auxiliary movable wall, but also there is eliminated a fear that the dropping of the inner peripheral end portion of the seal member into the hole of the auxiliary movable wall can destroy the airtight condition between the auxiliary variable pressure chamber and constant pressure chamber to cause the atmosphere within the auxiliary variable pressure chamber to flow into the constant pressure chamber, thereby eliminating a pressure difference between the auxiliary variable pressure chamber and constant pressure chamber, so that no load can be applied to the second output rod.

Yet still further, according to the invention, since the restriction portion of the auxiliary movable wall is engaged with the inner peripheral end portion of the seal member as the auxiliary movable wall is moved, the relative movement of the inner peripheral and portion of the seal member with respect to the auxiliary movable wall can be restricted positively.

Yet still further, according to the invention, since the axial length of the shaft portion of the first output member is set larger than the axial length of the hole of the auxiliary movable wall, that is, the amount of movement of the auxiliary movable wall, there is eliminated a fear that, when the second output rod is moved toward the output side relatively with respect to the first output rod, the engagement between the first and second output rods can be removed, that is, the first output rod can slip off the second output rod.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A negative pressure type booster, comprising:

a housing defining therein a pressure chamber;

a movable wall disposed movably within said housing for dividing said pressure chamber into a constant pressure chamber for communicating with a negative pressure source and a variable pressure chamber for selectively communicating with the atmosphere and with said negative pressure source;

a movable power piston connected with said movable wall;

an input member disposed within said movable power piston and movable in an axial direction thereof due to a brake actuation;

an output member outputting a propulsion force from said movable power piston in response to movement of said movable wall and divided in the axial direction thereof into a first output member situated on an input side thereof and a second output member on an output side thereof, said first output member and said second output member being movable relative to each other;

a control member for selectively communicating said variable pressure chamber with said negative pressure source or with the atmosphere according to movement of said input member against said movable power piston;

an auxiliary movable wall disposed in said constant pressure chamber and movable relative to said movable wall, said auxiliary movable wall being adapted to engage said second output member to move said second output member relative to said first output member during relative movement of said auxiliary movable wall and said movable wall;

an isolating member engaged with said auxiliary movable wall to form an auxiliary variable pressure chamber in cooperation with said auxiliary movable wall; and a communication chamber switching member for allowing said auxiliary variable pressure chamber to communicate selectively with said negative pressure source and the atmosphere.

2. A negative pressure type booster as set forth in claim 1, wherein said communication chamber switching means includes a through passage extending through said constant pressure chamber and communicating with said auxiliary variable pressure chamber, and an electromagnetic valve for allowing said through passage to communicate selectively with said negative pressure source and the atmosphere.

3. A negative pressure type booster as set forth in claim 1, wherein engagement between said movable wall and said auxiliary movable wall restrict the movement of said auxiliary movable wall to a given amount.

4. A negative pressure type booster as set forth in claim 1, wherein said movable wall includes in the inner peripheral end portion thereof a cylindrical portion disposed in coaxial relationship with said movable power piston and extending on the input side of said power piston, said auxiliary movable wall includes in the inner peripheral end portion thereof a cylindrical portion disposed in coaxial relationship with said movable power piston and extending into said cylindrical portion of said movable wall, said cylindrical portion of said auxiliary movable wall includes a recessed portion extending a given amount in the axial direction thereof, and said cylindrical portion of said movable wall includes a projecting portion engageable with said recessed portion.

5. A negative pressure type booster as set forth in claim 4, wherein said recessed portion is a hole portion, and the inner peripheral end portion of said seal member is engaged with the portion of said auxiliary movable wall cylindrical portion that is situated on the output side from said hole portion, and is moved integrally with said auxiliary movable wall.

6. A negative pressure type booster as set forth in claim 5, wherein said auxiliary movable wall cylindrical portion includes a restriction portion for restricting the axial movement of said seal member inner peripheral end portion so that the inner peripheral end portion of said seal member is movable integrally with said auxiliary movable wall.

7. A negative pressure type booster as set forth in claim 4, wherein said second output member includes a hole extending in the axial direction thereof from the input side and portion thereof, said first output member includes a shaft portion which is insertable into said hole formed in said second output member, and said shaft portion is set longer than the axially extending amount of said recessed portion.

8. A negative pressure type booster as set forth in claim 1, wherein said isolating member is flexible.

9. A negative pressure type booster as set forth in claim 1, wherein said control member has a valve member including an air valve part engageable with an air valve seat of said input member for cutting off said variable pressure chamber from the atmosphere and a vacuum valve part engageable with a vacuum valve of said movable power piston for cutting off communication between said constant pressure chamber and said variable pressure chamber.

* * * * *